United States Patent [19]

Adler et al.

[11] 3,773,982

[45] Nov. 20, 1973

[54] CROSS-SWITCHING CIRCUITRY FOR FOUR-WIRE EXCHANGE INSTALLATIONS

[75] Inventors: Roman Adler, Munich; Hartmut Gebhardt, Krailling, both of Germany

[73] Assignee: Siemens Aktiengesellschaft, Berlin and Munich, Germany

[22] Filed: July 30, 1971

[21] Appl. No.: 167,370

[30] Foreign Application Priority Data

July 31, 1970 Germany .................. P 20 38 213.2

[52] U.S. Cl. .............................................. 179/18 AF

[51] Int. Cl. .............................................. H04q 3/42

[58] Field of Search .................... 179/18 AF, 16 EC, 179/170 D, 18 GE

[56] References Cited

UNITED STATES PATENTS

| | | | |
|---|---|---|---|
| 3,394,232 | 7/1968 | Jaeger, Jr. et al. | 179/18 AF |
| 3,300,587 | 1/1967 | Knight et al. | 179/18 AF |
| 3,428,753 | 2/1969 | Pfleiderer et al. | 179/18 C |
| 3,655,922 | 4/1972 | Gerke et al. | 179/18 E |

FOREIGN PATENTS OR APPLICATIONS

| | | | |
|---|---|---|---|
| 1,066,974 | 4/1967 | Great Britain | 179/18 AF |
| 1,058,893 | 2/1967 | Great Britain | 179/18 EA |

*Primary Examiner*—Thomas W. Brown
*Attorney*—Harold J. Birch et al.

[57] ABSTRACT

Circuitry is described for use in a telecommunication exchange installation which has switching matrices for completing connections of four-wire lines. The exchange uses data processing switching techniques, and accordingly, an appropriate data processing or central control device is provided. The central control devices in various exchanges are connected to each other over data channels adjacent to the trunk lines for the transmission of dial characterizing signals (setting signals, line identifying signals and the like). All four-wire lines, i.e., local and long distance connection lines, and all switching devices (dial receiving registers, forwarding registers, connecting units and the like) are all similarly connected, with respect to the two, two-wire branches of the incoming or outgoing transmissions, to the terminal of the switching matrix inputs of a switching matrix having reverse grouping. Each switching matrix input is assigned a crossing relay serving to selectively cross the wire pairs. The crossing relay is associated with the switching matrix in construction and in terms of control. In each connection switched over the switching matrix one of the crossing relays at only one of the switching matrix inputs involved in the switching operation is activated.

9 Claims, 3 Drawing Figures

CROSS-SWITCHING CIRCUITRY FOR FOUR-WIRE EXCHANGE INSTALLATIONS

BACKGROUND OF THE INVENTION

The invention relates to a circuit arrangement for telecommunication exchange installations, especially telephone exchange installations having switching matrices for switching four-wire connections and having central control devices, which are connected with each other from exchange to exchange over data channels adjacent to the trunk lines which serve to transfer dial characterizing signals (setting signals and line identifying signals and the like).

Circuit arrangements of this type are known, at least in part or in a very similar manner, through the telephone exchange installations described in British Pat. No. 843,175 and in German Pat. No. DBP 1,097,491, U.S. Pat. No. 3,428,753, and corresponding British Pat. No. 1,085,998. It is well-known that the direct exchange of information over data channels between the central control devices of two exchange installations connected to each other over telephone connecting lines significantly simplifies and speeds up the establishment of a connection. The term central control device, as used herein, refers to the data processing portion of an exchange installation. The use of data processing techniques in telecommunication exchanges is known and need not be further discussed herein. If dial characterizing signals must be transmitted from one central control to the next, then, using conventional technology, these are passed through a forwarding register, outgoing line repeater, connection line, incoming line repeater, and receiving register in being communicated from central control to central control. A multiple conversion takes place hereby. This requires the expenditure of time (thus causing a slower formation of connections) and an increased expenditure for circuitry (expensive registers and line repeaters) and brings with it the danger of falsification of a signal (conversion error).

In contrast thereto, the circuit arrangements known from the cited references operate according to the principle of accomplishing the transmission of dial characterizing signals over a direct path, thus, avoiding the connection line and its line repeaters. An optimal solution in this respect exists in the measure, briefly described in the introduction, of connection of central control units to each other over data channels extending from exchange to exchange, adjacent to the corresponding trunk lines, which data channels serve to transfer dial characterizing signals.

The arrangement of central channels in this manner facilitates, in addition, the introduction of duplex operation over connection lines (local lines and long distance lines). Duplex operation, as used herein, refers to the possibility of selectively producing connections over a line from either end. The line repeaters which terminate the connection lines and which previously were necessary for the transmission of dial characterizing signals were principally used for this function, for reasons of expense only, for completing connections in only a single direction. Each repeater was provided a part bundle of incoming lines, a part bundle of outgoing lines and a part bundle of duplex lines, and the latter only to a relatively small extent, because the duplex manner of operation brings with it an increased expenditure for circuitry and operating conditions which are more difficult to fulfill (the danger of simultaneous double occupation of lines in opposite directions). Since the arrangement of central data channels makes it possible to get along without line repeaters of this type, this principle facilitates the introduction of duplex operation of the connection lines.

In this context, special consideration is required for four-wire switching of connections, mentioned in the introduction, in conjunction with the reverse grouping of switching matrices. In four wire through switching, two, two-wire branches in each path segment of the connection to be switched through are fixedly associated in pairs with each other for a connection. Each of the two, two-wire branches is designated only for one direction of transmission (not to be confused with the direction of production of a connection). The amplifiers lying in a two-wire branch are inserted in the sense of the given direction of transmission. A through four-wire connection thus comprises two, two-wire connections routed together but next to each other over any of many line segments, amplifiers, attenuators and exchange devices, which two-wire connections are each terminated at their two ends by four-wire terminating sets in the known manner.

Reverse grouping is a term used herein for an arrangement known as a construction principle for multiple stage switching matrices from the British Pat. No. 1,058,893. Reverse grouping consists of an arrangement for telecommunication exchange installations, especially telephone exchange installations, having a switching matrix, which is constructed of switching multiples in several coupling stages connected with each other over intermediate lines. At the switching matrix inputs of the first exchange switching stage therein, connection lines, subscriber lines (not present in purely long distance exchanges) and all inputs and outputs of the necessary switching members per connection for the production of the connection and supervision of the connection are present. In the switching matrix outputs of the switching multiples of the first through the last coupling stage are connected to the inputs of the switching multiples of the next successive coupling stage and can be switched together pair-wise therein. The common relay switching multiple, especially, and in addition, cross-bus selectors and cross couplers are utilized as switching multiples.

A switching matrix of this type with reverse grouping offers the advantage that all lines, for example, local lines and long distance lines, and switching devices, for example, dial receiving registers and forwarding registers, connecting units and the like, can be connected together with each other in any desired manner by means of the exchange. This offers great freedom with respect to the production of desired connections without the necessity of lines and switching devices being connected twice to the switching matrix, as would be necessary in switching matrices having conventional grouping. The conventional or so called elongated grouping comprises having switching matrix inputs at a first coupling stage and switching matrix outputs from a last coupling stage. Thus, even incoming and outgoing long distance connections and through connections can be switched through over a common switching matrix. All such through switching operations can be executed in exactly the same manner. Even duplex lines need only be connected once to the switching matrix. Further, through the possibility that two inputs of the first exchange switching stage are only switched through to one of the exchange switching stages preceding the last exchange switching stage, and can be connected together therein, a switching matrix can be so dimensioned that in the last exchange switching stage, over which not all of the switched connections pass, switching means may be saved in comparison with switching matrices having dimensional extended grouping. Following the latter explanation of reverse grouping, we move back to our disclosure of four-wire switching of telephone connections. The discussion of reverse grouping was made necessary by the fact that its application to switching matrices for four-wire switching raises special problems.

It is usual, in the application of four-wire lines and of switching members suitable for a four-wire switching, to refer to the direction of the formation of a connection. A first pair of lines is provided for the transmission of information in the direction of the formation of the connection, and a second pair of lines is provided for the transmission of information in the opposite direction. This means that in incoming four-wire lines (direction of formation of the connection) the first pair of lines serves for the transmission of information in incoming direction (direction of transmission) and the second pair of lines serves for the transmission of information in the opposite direction, i.e., in the outgoing direction. In outgoing four-wire lines, the first pair of lines serves for the transmission of information in outgoing direction and the second pair of lines serves for the transmission of information in the opposite direction, that is, in incoming directions. The same holds true for the input and output of the aforementioned switching members (registers, connection units and the like), in that an incoming four-wire line corresponds to an output of such a switching member and an outgoing four-wire line corresponds to an input of such a switching member. The four-wire lines are also connected according to this rule in known manner to the inputs and outputs of a switching matrix.

If the four-wire lines are connected to a switching matrix with reverse grouping, then through a corresponding wiring of the four-wire switching matrix inputs with the single directed or simplex (with respect to the direction of the formation of the connection) four-wire lines according to the rule given in the preceding paragraph, it can be achieved that in the formation of a connection over (through) the switching matrix, the two-wire branch with incoming direction of transmission of the incoming (with respect to the direction of formation of the connection) directed four-wire line is connected with the two-wire branch with outgoing direction of transmission of the outgoing (with respect to the formation of the connection) directed four-wire line. Also, the two-wire branch with outgoing direction of transmission of the incoming (with respect to direction of formation of the connection) directed four-wire line is connected with the two-wire branch with incoming direction of transmission of the outgoing (with respect to the direction of the formation of the connection) directed four-wire line.

If, in contrast, duplex four-wire lines are connected to a switching matrix with reverse grouping, there results the problem that whether the four wire line in a given case is operated incoming or outgoing is first indicated by the process of the formation of the connection. In order to also do justice to the above switching rule, under these conditions, it is usual to equip line repeaters for duplex four-wire lines with relays, with which, if necessary, a crossing of the line pairs is undertaken. These relays in the line repeaters with their control current circuits which run to the central control represent a considerable expense.

In summary, it can be determined, a. If one first neglects the problems of the connection of four-wire lines to switching matrices with reverse grouping, the transmission of dial characterizing signals over central data channels, that is, over a direct path from one central control to the next, facilitates the introduction of duplex connection lines.

b. It is usual to connect incoming and outgoing four-wire lines differently to the inputs of a switching matrix with reverse grouping.

c. Duplex four-wire lines require an additional expenditure for relays expressly serving to cross the line pairs in the affected line repeaters.

It is therefore an object of the invention to provide a circuit arrangement through which the construction of four-wire line connections to a switching matrix having reverse grouping will be unified, and in which the control operations with respect to the crossing of the line pairs shall be unified. In addition, the advantages offered by data technology shall be made usable.

SUMMARY OF THE INVENTION

The aforementioned and other objects are achieved in that all four-wire lines, for example, local lines and long distance lines, and all switching devices necessary for connection, for example, dial receiving registers and forwarding registers, connection units and the like, are connected in the same manner with respect to the position of their two, two-wire branches associated with the incoming or outgoing direction of transmission to the terminals of the switching matrix inputs of a switching matrix with reverse grouping. Each switching matrix input is assigned a crossing relay which serves for the selective crossing of the line pair and which is associated with the switching matrix in construction and control. In each connection switched through the switching matrix, one of the crossing relays is selectively activated only at one of the two switching matrix inputs involved in the switching of the connection.

The similar connection of all four wire lines and switching devices creates much more favorable operating conditions and service conditions than the previous method of connecting them to the terminals of a switching matrix differently with respect to the direction of formation of the connection. Since the crossing relays are associated with the switching matrix, the possibility offered by data technology of dispensing with, and thus, saving the line repeaters on connection lines of such trunk lines to which data channels for the transmission of dial characterizing signals are associated, can be made use of in an advantageous manner. Further, through the association of the crossing relays with the switching matrix, the crossing relays can be put together in matrix form. This results not only in a decrease in the cost of construction, but also, a simplification in control through at least partial common utilization of the current circuits of the switching matrix setting matrix. The apparent disadvantage of the switching efficiency of crossing relays for single direction four-wire lines, whose successive conversion to duplex operation, because of the advantageous possibilities given by the application of data technology for the transmission of dial characterizing signals, is to be expected in any case. This efficiency is significantly smaller than the saving in expense achieved by the matrix form combination of the crossing relays and their association with the switching matrix.

A further embodiment of the invention envisions that with the switching of each connection, one of the two pertinent crossing relays will be selectively activated by the central control device. There results herefrom a significant simplification for the central control device in comparison with the operation of the formation of a connection in conventional exchanges. This simplification is that at the connection of an incoming connection line with an outgoing connection line and by connection of an incoming and a duplex connection line, no crossing of the line pairs is undertaken. The contrary, however, is true for the connection of a duplex and an outgoing connection line. In addition, in previous exchange installations, according to the previously described rule, in the connection of two duplex connection lines, one of the two must be handled like an outgoing connection line. These different rules deviating from each other for the crossing of line pairs in the switching of a connection are replaced by the last mentioned embodiment of the invention in an advantageous simplification of the control operations by the one generally valid rule. That rule is that in the switching of each connection, one of the crossing relays, which are associated with the two switching matrix inputs taking part in the switching of the connection, is selectively activated.

Another embodiment of the invention envisions that the crossing relays be equipped with switch-over contacts, over the idle contacts of which the given switching matrix inputs can be connected with the given row line without a crossing of the line pair, and over the working contacts of which the given switching matrix input can be connected with the given row line with a crossing of the line pair. This solution is especially useful when relays equipped with switch-over contacts are available for the crossing relays. The number of the crossing relays thereby can be advantageously limited to a single relay for each switching matrix input.

Another embodiment of the invention envisions that two identical auxiliary relays serving to cross the line pair either having working contacts or having rest contacts are provided for each switching matrix input, and the given switching matrix input can be connected to the given row line over the contacts of the first of these auxiliary relays with a crossing of the line pair. The given switching matrix input can be connected to the given row line without crossing a line pair over the second of these auxiliary relays. This solution is especially advantageous from the point of view that the crossing relays just as the coupling relays can be of the same relay type (relays having only working contacts). This is especially favorable for the inclusion of the crossing relays in the switching matrix (from a structural viewpoint).

A further embodiment of the invention is based on the utilization of crossing relays having bistable switch-over contacts and envisions that in the formation of a connection, at each corresponding input, the crossing relay provided with switch-over contacts is only returned when at the affected inputs no crossing of the line pair is to be switched for the connection which is being switched through.

Another further embodiment of the invention is based on the utilization of crossing relays having bistable working contacts and envisions that in the formation of a connection, at each corresponding input, only the first, or second, auxiliary relay is returned when in the next switching of a connection, either no crossing or a crossing of a pair is to be switched at the affected input. These two further embodiments of the invention each have the advantage that the number of activations of each of the crossing relays is reduced. If one proceeds from the assumption that the number of activations of each of the switching relays of the first coupling stage in the mean is only equal to the number of occupations of the given switching matrix input divided by the number of the intermediate lines to the second coupling stage, then there is a significant advantage in the reduction of the actual mechanical activation of the crossing relay contacts which, among other things, become operative at each occupation of a switching matrix input. By this means, the switching frequency of the crossing relays and the coupling relays and therewith the statistical median lifespan of both is equalized to each other.

DETAILED DESCRIPTION OF THE DRAWINGS

Figure 1:
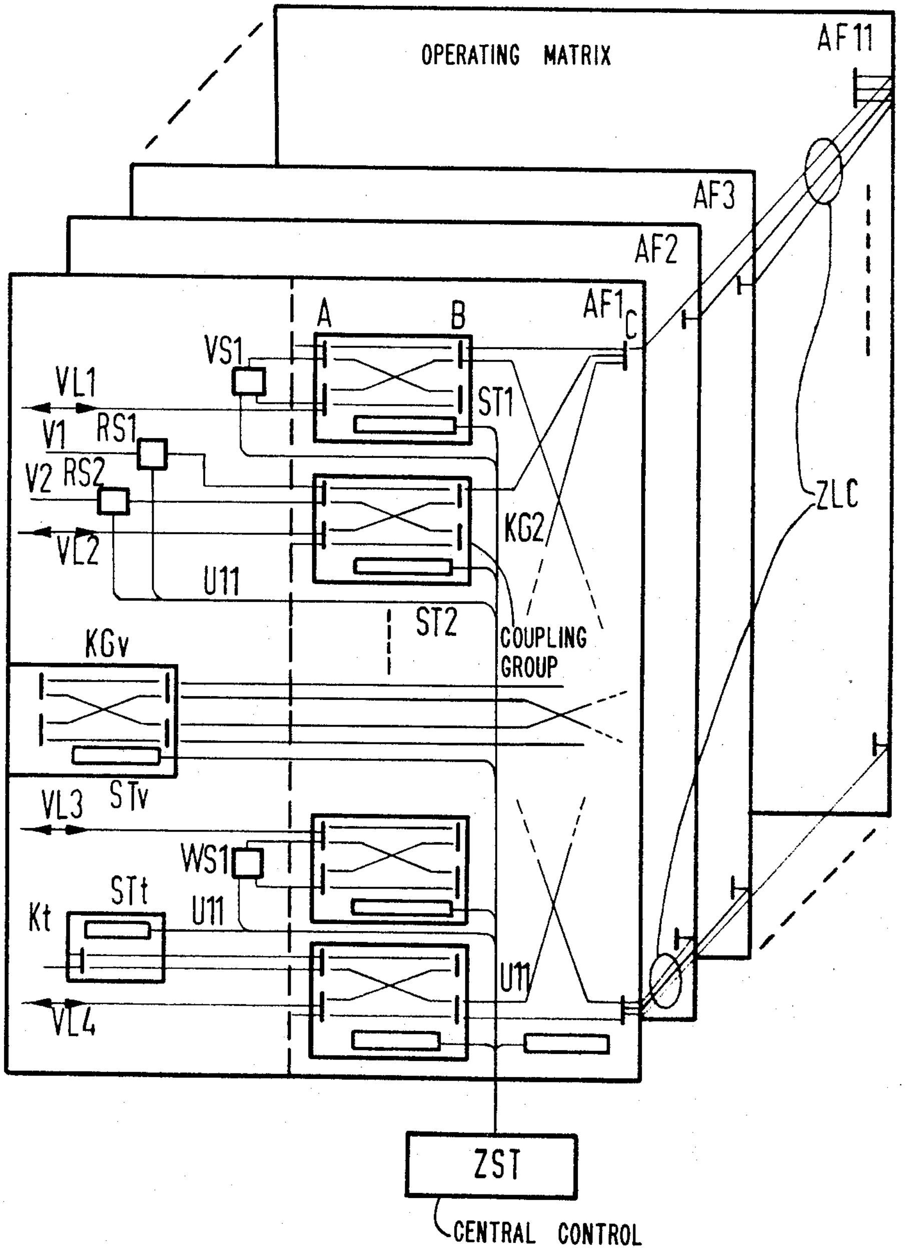
FIG. 1 is a schematic drawing of a preferred embodiment of the invention as incorporated in an otherwise conventional telephone exchange switching matrix.

The telephone exchange switching matrix shown in FIG. 1 is constructed for the switching of four wire connections. As is well known in four wire switching, two, two-wire branches in each path segment of the connection to be switched are fixedly associated pairwise with each of one connection. Each of the two, two wire-branches is designated for only one direction of transmission. The amplifiers lying in a two-wire branch are inserted in accordance with the given direction of transmission. A completed four-wire connection thus consists of two, two-wire connections routed over, optionally, many line segments, amplifiers, attenuators and path segments, which two-wire connections are each terminated on both their ends, as a rule, by a four-wire terminating set in a known manner.

The switching matrix shown in FIG. 1 is of a known construction and is formulated according to the principle of reverse grouping from British Pat. No. 1,058,893. For reasons pertaining to the technical construction, it is subdivided into several operating areas AF1 – AF11. The several operating areas form, however, a single common switching matrix. The said subdivision has no meaning for the grouping of the switching matrix. The switching matrix is constructed of switching multiples in three coupling stages A, B and C. Switching devices of different types are connected to the inputs of the first coupling stage in a fully identical manner. These switching devices are connection lines V1, V2, VL1 – VL4 and all inputs and outputs of the switching members VS1, RS1, RS2, WS1, necessary for each connection for the formation and supervision of the connection. All lines and switching members are four-wire. Outputs of the switching multiples of the first through the second coupling stage, which are individually connected to the inputs of the switching multiples of the next coupling stage in order, can be connected together in pairs in this next successive coupling stage in this order.

According to the above mentioned British Pat. No. 843,175, the special characteristic of a known switching matrix of this type consists of the fact that from one switching matrix input the outputs of each of the switching multiples can be reached over one single connection path, at the most. In a line finding operation from one switching matrix input, the path to be switched through the switching matrix for the desired connection is thereby already clearly fixed by the selection of one of these outputs. Viewed from its inputs to the ouputs of its couplers, the switching matrix is constructed in a cell-like manner. In spite of this, two switching matrix inputs can be alternatively connected to each other over different paths, in that several common switching multiple outputs are always accessible from the two switching matrix inputs. That is to say, that each two of the switching multiple outputs belonging to the last coupling stage in different operating areas and firmly connected over an intermediate line in each case, can be reached in several ways.

The operating areas, for example, AF1, each exhibit three coupling stages, the switching multiples in which are connected over intermediate lines in such a manner that each switching multiple output in the first through the second coupling stage (A and B) is individually fixedly associated with a switching multiple input in the second through the last coupling stage (B and C). The outputs of the switching multiples of the coupling stage C are partially unwired in all operating areas AF1 through AF11. This state of affairs is meaningful for the switching of connections over short paths described in detail below. A portion of the last mentioned outputs of the operating areas AF1 through AF11 is further connected together individually in pairs over intermediate lines ZLC leading from working field to working field. This connection arrangement extends equally to all operating areas. Thus, each of the operating areas is connected to each of the other operating areas over an equal number of intermediate lines ZLC.

The switching multiples in the coupling stages A and B are connected in the shown manner into coupling groups, for example KG2. Each of the coupling groups is associated with an individual coupling group control, for example ST2. However, it is also just so possible to associate several, for example four, coupling groups with a common coupling group control. The coupling group controls are controlled by a central control unit ZST.

Connections over the switching matrix shown in FIG. 1 are always produced in such a way that two of its terminals are connected to each other. As is shown for the operating area AF1, the switching matrix has only switching terminals of similar type, i.e., it has no switching matrix inputs and switching matrix outputs which would be found in conventional telecommunication exchange installations of this type. A connection between a switching matrix terminal in the operating area AF1 and a switching matrix terminal in operating area AF2, is, thus, always produced over two times three coupling stages. In contrast thereto, a connection which is produced within one and the same operating area, need only run over a total of five coupling stages. A connection which is produced between two switching matrix terminals of one and the same coupling group, need run only over a total of three coupling stages. A connection between two switching matrix terminals lying at the same switching multiple of the coupling stage A runs only over one single switching multiple. The course of a connection switched through over fewer than six coupling stages is also designated as a short path. This is further explained hereinbelow. A connection which is to be produced, for example, between the subscriber T2 and the relay set RS2 of an outgoing connection line, passes over two switching multiples of the coupling stage A and over one switching multiple of the coupling stage B. A switching multiple of coupling stage C is not required.

A switching matrix formulated according to the illustration in FIG. 1 thus makes possible the production of switching matrix connections over so-called short paths. Through the preferred formation of connections over short paths, the workload of the coupling stages, which are placed opposite the terminal side of the switching matrix, can be substantially reduced. This fact allows less sophisticated switching multiples to be provided in these coupling stages, whereby a significant saving on coupling relays is achieved in these coupling stages.

In each of these coupling stages, the switching multiples have inputs and outputs. The inputs correspond to row lines and the outputs correspond to column lines. This association is, however, in no way binding on optional formulations of the invention. Column lines could just as well be associated with the inputs and row lines could just as well be associated with the outputs. These designations "row" and "column" refer mainly only to the drawings. Each of the row lines crosses each of the column lines. At each cross point a coupling relay is provided, so that each of the row lines can be connected to each of the column lines.

Following foregoing general description of the structure of the switching matrix of a telephone exchange installation according to FIG. 1, reference will hereafter be made to the particular inventive details.

It has already been explained that subscriber lines T1 through T6, connection lines V1 and V2 over line repeaters RS1 and RS2, further connection lines VL1 through VL4 without line repeaters, further connection units VS1 and dial receiver units WS1 are connected to the inputs of the switching matrix. The connection lines V1 and V2 belong to line trunks to exchange installations in accordance with conventional technology. Thus, dial characterizing signals (setting signals and line identifying signals and the like) are also transmitted over these connection lines. The connection lines VL1 through VL4 belong to trunks each of which is associated with a common data channel for the transmission of dial characterizing signals. Thus, they lead to exchange installations, which function in the same or in a similar manner with a central control device as the one described here. As has likewise been already explained, all of these lines and switching devices are four-wire. Each of these four-wire lines and each of these four-wire switching members has a first two-wire branch for incoming — viewed from the point of the switching matrix — transmission of information and a second two-wire branch for outgoing — likewise, viewed from the point of the switching matrix — directed transmission of information. With respect to these two, two-wire branches, all of these lines and switching members are connected to the switching matrix in the same manner. This means that the first of the two, two-wire branches which belong together, of a four-wire line or of a four-wire switching member, are connected to two first current circuits of the pertinent switching matrix input, and the second of the two, two-wire branches, which belong together, of the same line or the same switching member is connected to two second current circuits of the same pertinent switching matrix input.

In order not to connect the first two-wire branch of a first switching matrix input to the first two-wire branch of another switching matrix input and the second two-wire branch of the same first switching matrix input to the second two-wire branch of the same other switching matrix input during the formation of a connection over the four-wire switching matrix, crossing relays are provided for each switching matrix input (not shown in FIG. 1). In the formation of each connection over the four-wire switching matrix, a crossing of a line pair is undertaken at one of the two switching matrix inputs involved. For this, an appropriate crossing relay is activated at the pertinent switching matrix input in a manner to be described in detail below. At this switching matrix input, the first two-wire branch of the affected line or of the affected switching member is thereby connected to the two second current circuits of the affected row line of the switching multiple of coupling stage A and the second of the two, two-wire branches is thereby connected to the two first current circuits of the affected row line. This causes in each formation of a connection the first of the two, two-wire branches of a line or of a switching member to be connected to the second of the two, two-wire branches of another line or of another switching member. The same is true for the corresponding second two-wire branch and the corresponding first two-wire branch of the same line or switching member, which are connected to each other over the four-wire switching matrix. In each formation of a connection a crossing of a line pair at one switching matrix input is thus undertaken in each case. The given switching matrix input can be freely selected for this purpose by the affected central control.

Figures 2, 3:
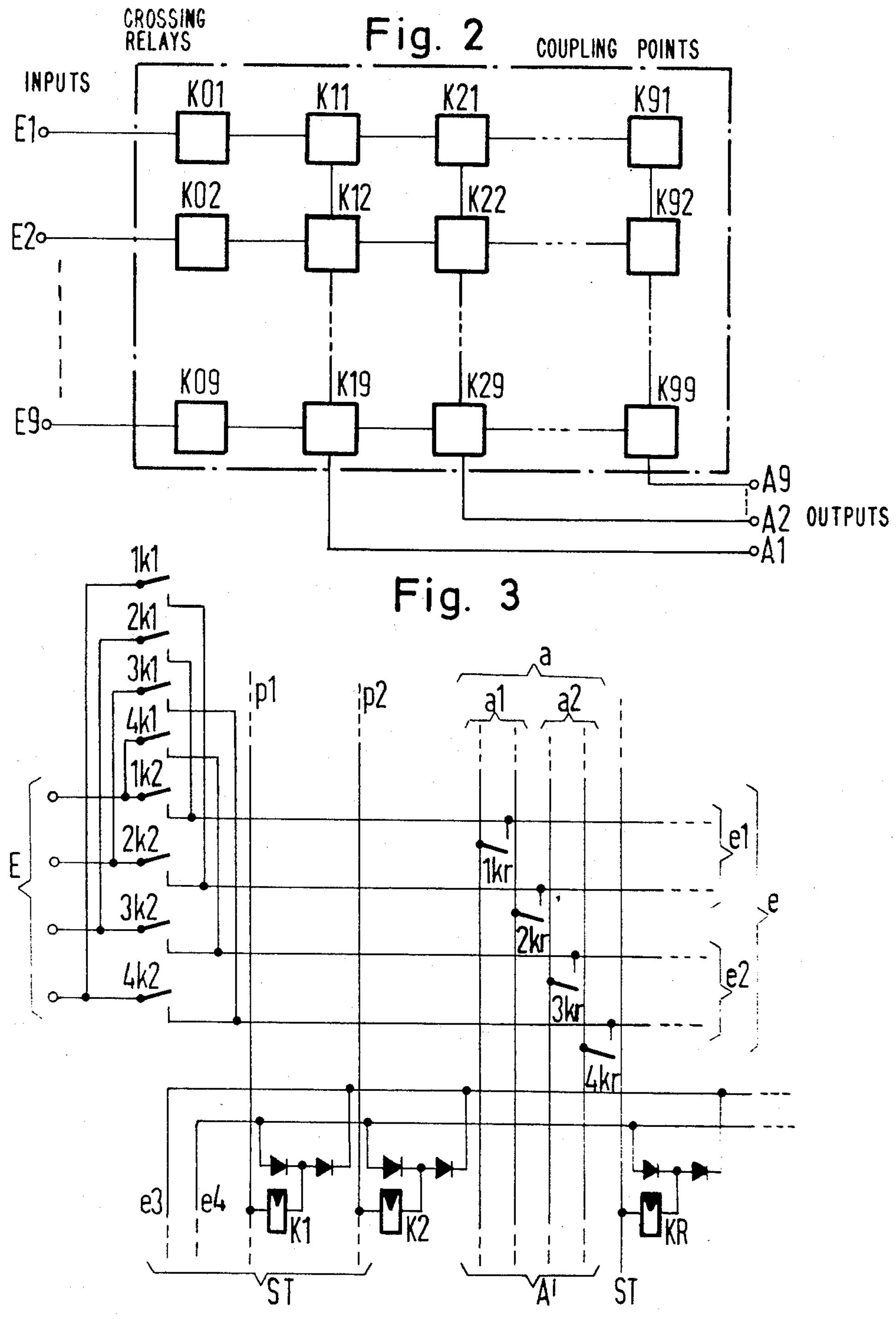
FIG. 2 is a schematic representation of one of the switching multiples in a coupling stage in the switching matrix of the FIG. 1 embodiment.
FIG. 3 is a more detailed drawing of the FIG. 2 switching multiple.

In FIG. 2 one of the switching multiples of the coupling stage A of FIG. 1 is reproduced in further detail. The switching multiples of the coupling stage A in FIG. 1 are all constructed in the same manner. The switching multiple shown in FIG. 2 has nine inputs E1 through E9 and nine outputs A1 through A9. The nine switching matrix inputs E1 through E9 correspond to nine four-wire row lines. Each of these passes over a crossing relay KO1 through KO9. Further, these row lines pass in known manner through the coupling points K11 through K99. Column lines shown vertically run in the other coordinate direction through the same coupling points.

The column lines correspond to the outputs A1 through A9. The column line corresponding to the output A1 passes through the coupling points K11 through K19. Each of the coupling points is formed by a four contact holding relay. Two, two-contact relays or four one contact relays could just as well take the place of a single four-contact relay. With the help of these coupling relays a specific switching multiple input and a specific multiple output can selectively be connected to each other in a known manner. The column lines are also four-wire like the row lines.

In construction techniques, the crossing relays KO through K9 are associated with the switching matrix, and indeed, with the switching multiples of the coupling stage A. They can be developed as relays with switch-over contacts. If in this case, each row line corresponds to a crossing relay, the two, two-wire branches of the affected switching matrix inputs are connected uncrossed to the affected row line passing through the appropriate coupling point. If, in contrast, the affected crossing relay is activated, then the two, two-wire branches will be crossed in a well known manner. A first two-wire branch coming from the affected input, for example E1, is connected to the second two-wire branch of the affected row line in the switching multiple and the second two-wire branch of the same input is connected to the first two-wire branch of the same row line. If relays with switch-over contacts are utilized as crossing relays, then only a single crossing relay for each switching matrix input is necessary for the crossing of the line pairs.

If relays having only working contacts are utilized for the crossing of the line pairs, then two relays for each switching matrix input are necessary. However, the fact that the same type of relay can be utilized for the crossing relays and for the coupling relays in this form of the invention is advantageous. This allows far-reaching constructive integration of the crossing relays in the switching multiples of the coupling stage A of the switching matrix. If the crossing relays are developed as relays with working contacts, then one of the two relays provided for each switching matrix input serves for the switching of the switching matrix input, for example E1, to the row line passing through the affected coupling points, for example K11 through K91, without crossing the line pair. In contrast, the other of these two relays serves for the switching of the two, two-wire branches with crossing.

The relays serving to cross the line pairs, either those with switch-over contacts or those with working contacts, are activated and returned by the central control at the same time as the affected coupling relays. The coupling relays and the crossing relays are developed as self-holding relays. After the extinction of a connection, the connection path switched through over the switching matrix continues to exist, i.e., the affected coupling relays and, if necessary, crossing relays remain activated. In formation of a connection each row of coupling relays and column of coupling relays in each switching multiple over which the new connection is to be switched through are reverted to their original positions in a manner not described in detail. That means that the coupling relays of the aforesaid row and the coupling relays of the aforesaid column all first receive return activation, whereupon the coupling relay lying at the cross point of the appropriate row and of the appropriate column is first brought into engagement in a further switching operation. This setting operation pertains to all switching multiples, over which the new connection is to be switched through.

If the crossing relays are developed as relays with switch-over contacts, it is envisioned that in the formation of a connection the affected crossing relay at each affected switching matrix input will only be returned, when no crossing of the line pair is to be effected for the switching through of the connection at the pertinent switching matrix input. Thus, if a crossing relay with switch-over contacts is still to be found in the engaged condition from a preceding connection, in which it effects a crossing of the line pair, and if a crossing of the line pairs is also necessary at this switching matrix input in the new connection, then the pertinent crossing relay remains engaged. It is not temporarily switched back in the operation of returning the system to its original position.

The behavior is similar when the crossing relays are developed as relays with working contacts. In this case, during and after the existence of a connection one of the two crossing relays provided for each switching matrix input is always engaged. In the formation of a connection at each corresponding input only the first auxiliary relay is returned and no crossing of the line pairs is to be effected in the switching through of the next connection at the pertinent input. If one now considers a specific switching matrix input, then it follows that the two relays serving to cross the line pairs could maintain their position throughout several connections. When in these several connections the same condition with respect to the crossing of the line pairs is always required at this switching matrix input, either crossing or non-crossing of the two, two-wire branches is accordingly effected.

Further details of the switching matrix represented in FIG. 2 are shown in FIG. 3. A switching multiple input E, two crossing relays K1 and K2 associated therewith having the contacts $1k1$ through $4k2$, a coupling relay KR having the contacts $1kr$ through $4kr$ and a switching matrix output a', are shown. It is assumed that the switching matrix input E in FIG. 3 corresponds to the switching matrix input E1 in FIG. 2. Further, the switching matrix output A' corresponds to the switching matrix output A1. The crossing relays K1 and K2 correspond to the switching unit designated K01 in FIG. 2 and the coupling relay KR corresponds to the coupling point K11. The further switching multiple inputs, crossing relays, coupling points, row lines, column lines and switching multiple outputs shown in FIG. 2 are similarly developed in the usual manner.

In FIG. 3 only a portion of the FIG. 2 assembly, the switching matrix input E together with a corresponding row line and the switching matrix output A' together with a corresponding column line, are reproduced. The row line includes two, two-wire lines $e1$ and $e2$ combined together to form a four-wire line $e$. In addition, the row line includes control current circuits $e3$ and $e4$ for the engaging and returning of the crossing relays and of the coupling relays. These setting current circuits are thus provided in common for the coupling relays and the crossing relays. The column line likewise includes two, two-wire circuits $a1$ and $a2$ combined to form a four wire line $a$. A current circuit $a3$ for the engagement and return of the coupling relays also belongs to the column line. The crossing relays of a switching multiple are combined in a column corresponding to the column lines. Common current circuits $p1$ and $p2$ correspond thereto, respectively, for engagement and for return. The crossing relays and the coupling relays are of the same type of relay.

For the formation of connections, various switching multiple inputs and outputs of coupling relays are connected with each other by activation of the relays in a known manner, and two inputs of the switching matrix are thereby connected together over intermediate lines according to selection. A first, second, third and fourth wire of a row line of a switching multiple of the first coupling stage are hereby connected to a first, second, third and fourth wire of another row line of a switching matrix of the first coupling stage. That means that the two wires corresponding to a first two-wire branch of the two row lines of the pertinent switching multiples of the first coupling stage, and the two wires corresponding to a second two-wire branch of the two row lines on the other side are connected to each other. Therefore, in the formation of each connection a crossing of the wire pairs at one of the two affected switching matrix inputs is undertaken by the central control (ZST in FIG. 1). To accomplish this, the first crossing relay is activated at one of the two switching matrix inputs and the second crossing relay is activated at the corresponding other switching matrix input. The relays K1 and K2 are both designated here as "crossing relays" for reasons of simplicity, because they both serve to selectively cross the wire pairs at the switching matrix inputs. It should be kept in mind, however, that the first crossing relay K1 actually effects a crossing of a wire pair, insofar as it is brought into engagement, while the second crossing relay K2 connects the current circuits of the given switching matrix input directly through to the wires of the pertinent row line with its engagement, i.e., without crossing of the wire pairs.

The same circuits serve partially for the control of the coupling relays and of the crossing relays in a control matrix common to both, and indeed, the same row control lines $e3$ and $e4$ for each row are used. The control current circuits $p1$ and $p2$ belonging to the same control matrix with the column control lines, for example a3, serve to engage and return the crossing relays K1 or K2.

If in FIG. 3, the coupling relay KR is to be brought into engagement, then a positive potential is applied to the row control line and ground potential to the column control line in a known manner. If, in contrast thereto, the coupling relay KR is to be switched back, a negative potential is applied to the row control line $e3$ and ground potential to the column control line $e3$, likewise, in a known manner. The same holds for the crossing relays K1 and K2, whereby, however, the control line $p1$ or $p2$ takes the place of the column control line $a3$.

Coupling relays and crossing relays are similarly developed as holding relays. Their contacts are brought to the working position by activation of the relay with a current in one direction and are brought back to the rest position with a current in the opposite direction. After extinction of the connection, the relays which have taken part in the given connection retain their given positions. The coupling relays are first switched back at the formation of a new connection. At the switching through of a connection, all of the coupling relays lying in the given row and all lying in the given column in each affected switching multiple first receive return activation, and subsequently, only the coupling relay lying at the crosspoints of the affected row and of the affected column receives engagement activation. The coupling relay which is last engaged is, thus, first returned to the rest position, and again, brought into engagement according to the above given functional scheme. In order to limit the number of activations of the crossing relays in view of their life span to approximately the number of activations of the coupling relays, only that crossing relay which will not be activated in the subsequent setting operation (engagement operation) receives return activation in the formation of a connection.

It can be provided that the crossing relays maintain their position throughout the switching of several connections by suitable control of the crossing relays. If, for example, in incoming lines the crossing relays are brought into engagement while outgoing lines are not, and duplex lines are sometimes in engagement, the workload of the central conrol device and of the corresponding control current circuits, inter alia, can be reduced, along with the number of activations of the crossing relays.

The preferred embodiment of the invention is only described to illustrate the principles of the invention and is in no way intended to define the scope of the invention. The scope of the invention is defined by the appended claims within which many modifications to or changes in the preferred embodiment will fall.

We claim:

1. In a telecommunication exchange installation operated by a central control device, which central control device is connected to central control devices in other exchanges over data channels adjacent to trunk lines, said data channels serving to communicate dial characterizing signals, said exchange having a reverse grouping switching matrix for switching four wire connections and having four wire local and long distance connection lines and switching devices constituted by dial receiving registers, forwarding registers and the like for completing a connection, each said four wire line being constituted by two, two wire pairs, the improvement comprising:

means for connecting the ones of said connection lines and said switching devices necessary to complete a given connection to the switching matrix input terminals so that the relative positions of said two, two wire pairs for said connection lines and said switching devices in the given connection are alike, crossing relay means at each switching matrix input for selectively crossing wire pairs of said connected ones of said connection lines, said crossing relay means having contact means for selectively connecting said switching matrix input terminals used for said given connection to said ones of said connection lines either directly or by crossing ones of the wire pairs in the connection lines and being integrally constructed with said switching matrix and controlled therefrom and means actuating crossing relay means at only one of the two inputs involved in switching through a connection in said switching matrix for each said connection.

2. The improved exchange installation defined in claim 1 wherein said actuating means is controlled from said central control means.

3. The improved exchange installation defined in claim 1 further comprising coupling relays and wherein said switching matrix is comprised of a plurality of coupling stages, each said coupling stage being comprised of a plurality or row and column lines and wherein the said row lines in said first coupling stage form the inputs to said switching matrix, common ones of said row lines communicating controlling signals to said coupling and crossing relays.

4. The improved exchange installation defined in claim 3 wherein said crossing relay means are additionally controlled through individual ones of said column lines which are common to several crossing relay means.

5. The improved exchange installation defined in claim 4 wherein said column lines controlling said crossing relay means are of like construction with said column lines controlling said coupling relays.

6. The improved exchange installation defined in claim 3 wherein said crossing relay means comprise switchover contacts and further comprising;

means selectively connecting a given switching matrix input to a given row line over the idle contacts of a given crossing relay means without crossing wire pairs and means for selectively connecting said given switching matrix input to said given row line over the working contacts of said given crossing relay means with the crossing of a wire pair.

7. The éxchange installation defined in claim 3 further comprising;

at least identically constructed auxiliary relays for each switching matrix input, means for selecting one of said auxiliary relays for operation, means connecting a given switching matrix input to a given row line over one of said auxiliary relays without crossing wire pairs and means connecting said given switching matrix input to said given row line over the other of said auxiliary relays, while crossing wire pairs.

8. The exchange installation defined in claim 7 wherein said other auxiliary relay is constructed as a holding relay.

9. The exchange installation defined in claim 6 wherein the ones of said crossing relay means engaged in completing a connection over a row and a column line remain engaged until a new connection switching operation is commenced and wherein in each formation of a connection over a given switching matrix input the said crossing relay means having switchover contacts located thereat will be returned only when no crossing of wire pairs is to be effected.

* * * * *